US010740791B2

(12) United States Patent
Sugaya (10) Patent No.: US 10,740,791 B2
(45) Date of Patent: Aug. 11, 2020

(54) CAMERA RETRIEVAL SERVER, CAMERA RETRIEVAL METHOD AND PROGRAM FOR CAMERA RETRIEVAL SERVER

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 428 days.

(21) Appl. No.: 14/982,145

(22) Filed: Dec. 29, 2015

(65) Prior Publication Data

US 2016/0335663 A1 Nov. 17, 2016

(30) Foreign Application Priority Data

May 12, 2015 (JP) ................................. 2015-097002

(51) Int. Cl.
*G06Q 30/02* (2012.01)
*H04N 5/232* (2006.01)
*G06F 17/00* (2019.01)

(52) U.S. Cl.
CPC ..... *G06Q 30/0254* (2013.01); *G06Q 30/0277* (2013.01); *H04N 5/23206* (2013.01)

(58) Field of Classification Search
USPC .......................................................... 705/14
See application file for complete search history.

(56) References Cited

U.S. PATENT DOCUMENTS

| 2005/0152287 A1* | 7/2005 | Yokomitsu | ........ H04L 29/06027 370/255 |
| 2009/0037262 A1* | 2/2009 | Patil | ...................... G06Q 30/02 705/14.54 |
| 2011/0238495 A1* | 9/2011 | Kang | ..................... G06Q 30/02 705/14.49 |

(Continued)

FOREIGN PATENT DOCUMENTS

JP 2011-124940 6/2011

OTHER PUBLICATIONS

Connecting Smart Things through Web Services Orchestrations, Antonio Pintus, Davide Carboni, Andrea Piras, and Alessandro Giordano (Year: 2010).*

(Continued)

*Primary Examiner* — Gautam Ubale
(74) *Attorney, Agent, or Firm* — Lex IP Meister, PLLC (57) ABSTRACT

The present invention is to provide a camera retrieval server, a camera retrieval method, and a program for the camera retrieval server, which enables a network camera with high advertising effectiveness to be recognized and retrieved when a company's advertisement is published. The present invention provides a camera retrieval server associates and stores an identifier identifying a network camera, a link destination display request rate showing a display request rate when the display request is made for a link destination related to a banner advertisement replayed together with a moving image output from the network camera, and a keyword showing the type of the banner advertisement, and (Continued)

accepts an input of a predefined keyword from an advertiser's terminal, compare the entered keyword with keywords stored in the server, and extract an identifier of the network camera with a high display request rate for the link destination.

2 Claims, 8 Drawing Sheets

(56) References Cited

U.S. PATENT DOCUMENTS

| | | | | |
|---|---|---|---|---|
| 2013/0093897 A1* | 4/2013 | Fan | ............... | H04N 5/23229 348/159 |
| 2014/0376448 A1* | 12/2014 | Kao | ............... | H04W 76/021 370/315 |
| 2015/0189347 A1* | 7/2015 | Oztaskent | ......... | H04N 21/4722 725/32 |
| 2015/0379557 A1* | 12/2015 | Liu | ............... | G06Q 30/0244 705/14.43 |
| 2016/0234420 A1* | 8/2016 | Lee | ............... | H04N 1/00315 |

OTHER PUBLICATIONS

Ecological image databases: From the webcam to the researcher, John Porter, Chau-Chin Lin, David E. Smith, Sheng-Shan Lu (Year: 2009).*

* cited by examiner

LINK DESTINATION DISPLAY REQUEST RATE MEMORY TABLE

| CAMERA IDENTIFIER | NO.1 ADVERTISEMENT CLICK-THROUGH RATE ||| NO.2 ADVERTISEMENT CLICK-THROUGH RATE |||
|---|---|---|---|---|---|---|
| | AD CONTENT | KEYWORD | CLICK-THROUGH RATE | AD CONTENT | KEYWORD | CLICK-THROUGH RATE |
| NW-A001 | XXXXX | A, special product | 0.3% | ZZZZZ manufactured by Y company | Y company, mountainneering, goods | 0.25% |
| BB-NW001 | WWWWW | B, image, photograph | 0.5% | UUUUU manufactured by V company | V company, B, water | 0.1% |

Fig. 8

VOCABULARY DATABASE

| ARTICLE NAME | KEYWORD |
|---|---|
| xxxxx | A, special product, cake, gift-giving, famous confection, red bean |
| wwwww | B, image, photograph, landscape, wallpaper, scenery |
| zzzzz | Y, mountaineering, goods, clothes, outers |
| uuuuu | V, water, hard water, soft water, natural, natural water |

CAMERA RETRIEVAL SERVER, CAMERA RETRIEVAL METHOD AND PROGRAM FOR CAMERA RETRIEVAL SERVER

CROSS REFERENCE TO RELATED APPLICATIONS

This application claims priority to Japanese Patent Application No. 2015-097002 filed on May 12, 2015, the entire contents of which are incorporated by reference herein.

TECHNICAL FIELD

The present invention relates to a camera retrieval server, a camera retrieval method, and a program for the camera retrieval server for retrieving the network camera with high advertising effectiveness.

BACKGROUND ART

In recent years, a network camera is set up in various places, such as sightseeing spots, farms, and home under IoT (Internet of Things), and a user can watch videos from the remote place to grasp the situations and enjoy the sceneries through the network camera.

Moreover, a technology inserting an advertisement such as banners inside the frame or to the bottom of the frame of such a network camera image is disclosed (for instance, refer to Patent Document 1). According to Patent Document 1, a system acquiring an advertisement appropriate for a network camera image and displaying it at the designated position of the network camera image has been disclosed.

CITATION LIST

Patent Literature

Patent Document 1: JP 2011-124940 A

SUMMARY OF INVENTION

However, in the method disclosed in Patent Document 1, when the advertiser inserts an advertisement such as its own content or article, the advertiser can select an advertisement matched with a network camera image, but the validity of an actual advertising effectiveness is not clear. Therefore, it is difficult to judge whether or not the banner advertisement is displayed in the video imaged by a network camera with high advertising effectiveness.

The inventor of the present invention has paid attention to retrieve a network camera with high advertising effectiveness, and an advertisement such as banner can be provided to the retrieved network camera.

Accordingly, an objective of the present invention is to provide a camera retrieval server, a camera retrieval method, and a program for the camera retrieval server, which enables a network camera with high advertising effectiveness to be recognized and retrieved when a company's advertisement is published.

The first aspect of the present invention, a camera retrieval server retrieving a network camera includes:

a link destination display request rate memory unit that associates and stores an identifier identifying a network camera, a link destination display request rate showing a display request rate when the display request is made for a link destination related to a banner advertisement replayed together with a moving image output from the network camera, and a keyword showing the type of the banner advertisement; and a network camera identifier extracting unit that accepts an input of a predefined keyword from an advertiser's terminal, compares the predefined keyword with a keyword stored in the link destination display request rate memory unit, and extracts the identifier of the network camera with a high display request rate for the link destination.

According to the first aspect of the present invention, a camera retrieval server retrieving a network camera associates and stores an identifier identifying a network camera, a link destination display request rate showing a display request rate when the display request is made for a link destination related to a banner advertisement replayed together with a moving image output from the network camera, and a keyword showing the type of the banner advertisement, and accepts an input of a predefined keyword from an advertiser's terminal, compares the predefined keyword with a keyword stored in the link destination display request rate memory unit, and extracts the identifier of the network camera with a high display request rate for the link destination.

The first aspect of the present invention is the category of a camera retrieval server, but the categories of a camera retrieval method and a program for the camera retrieval server have the same functions and effects.

The second aspect of the present invention, the camera retrieval server according to the first aspect of the present invention includes:

a vocabulary database memory unit that stores a vocabulary database associating an article included in the banner advertisement with a keyword related to the article, wherein the network camera identifier extracting unit searches the stored vocabulary database with the input predefined keyword.

According to the second aspect of the present invention, the camera retrieval server according to the first aspect of the present invention stores a vocabulary database associating an article included in the banner advertisement with a keyword related to the article, and searches the stored vocabulary database with the input predefined keyword.

According to the third aspect of the present invention, the camera retrieval server according to the first or second aspect of the present invention includes:

a display request receiver unit that receives a display request for a link destination related to a banner advertisement;

a keyword extracting memory unit that extracts and stores a keyword from the received display request;

a keyword associating memory unit that associates and stores the stored keyword with a display request rate for the link destination; and a keyword transmitter unit that transmits a keyword with a high display request rate for the link destination to the advertiser's terminal.

According to the third aspect of the present invention, a camera retrieval server according to the first or the second aspect of the present invention receives a display request for a link destination related to a banner advertisement, extracts and stores a keyword from the received display request, associates and stores the stored keyword with a display request rate for the link destination, and transmits a keyword with a high display request rate for the link destination to the advertiser's terminal.

The fourth aspect of the present invention, a method for retrieving network camera includes the steps of:

associating and storing an identifier identifying a network camera, a link destination display request rate showing a display request rate when the display request is made for a link destination related to a banner advertisement replayed together with a moving image output from the network camera, and a keyword showing the type of the banner advertisement; and accepting an input of a predefined keyword from an advertiser's terminal, comparing the entered keyword with keywords stored in the link destination display request rate memory unit, and extracting an identifier of the network camera with a high display request rate for the link destination.

The fifth aspect of the present invention, a computer program product for use in a camera retrieval server, retrieving a network camera, includes a non-transitory computer usable medium having a set of instructions physically embodied therein, the set of instructions including computer readable program code, which when executed by the user terminal causes the information processing unit to:

associate and store an identifier identifying a network camera, a link destination display request rate showing a display request rate when the display request is made for a link destination related to a banner advertisement replayed together with a moving image output from the network camera, and a keyword showing the type of the banner advertisement; and accept an input of a predefined keyword from an advertiser's terminal, compare the entered keyword with keywords stored in the link destination display request rate memory unit, and extract an identifier of the network camera with a high display request rate for the link destination.

The present invention provides a camera retrieval server, a camera retrieval method, and a program for the camera retrieval server, which enables a network camera with high advertising effectiveness to be recognized and retrieved when an advertisement of the company is published,

DESCRIPTION OF EMBODIMENTS

Embodiments of the present invention are described below with reference to the attached drawings. However, this is illustrative only, and the technological scope of the present invention is not limited thereto.

Outline of Camera Retrieval System 1

Figure 1:
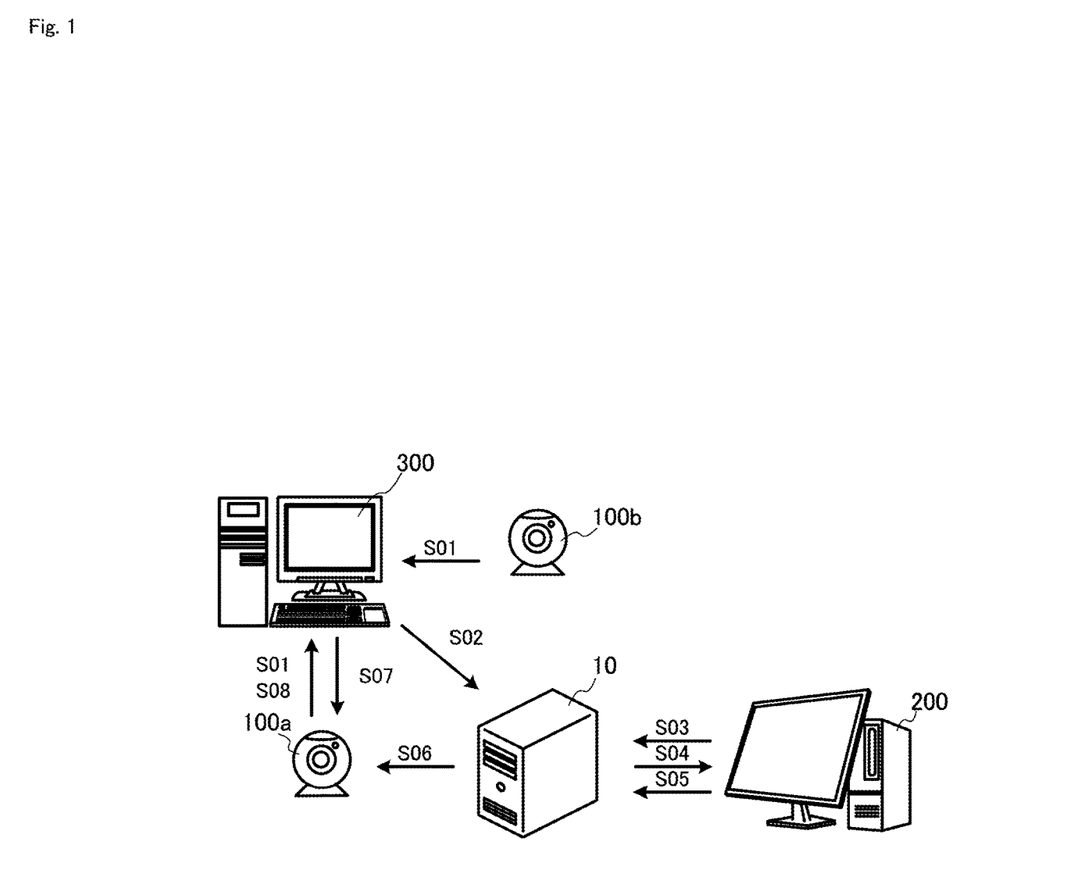
FIG. 1 shows an overall view of the camera retrieval system 1.

FIG. 1 shows an overall view of the camera retrieval system 1 according to a preferred embodiment of the present invention. The camera retrieval system 1 includes network cameras 100a and 100b, a camera retrieval server 10, an advertiser's terminal 200, and a user terminal 300.

In the camera retrieval system 1, firstly, the user terminal 300 displays the video imaged by the network cameras 100a and 100b, and the banner advertisement related to the video at the designated position of the video (such as designated position in the video or inside the frame displaying the video) (Step S01). The user terminal 300 transmits camera identifiers identifying network cameras 100a and 100b, a link destination click information showing that the displayed banner advertisement is clicked and the display request for a link destination related to this banner advertisement is made, and the keyword (for instance, brand name, name of a place, manufacturer name, and type) showing the type of this banner advertisement to the camera retrieval server 10 (Step S02).

The camera retrieval server 10 receives a camera identifier, link destination click information, and keywords identifying the network cameras 100a and 100b from the user terminal 300. The camera retrieval server 10 calculates the link destination display request rate showing the frequency of the display request for a link destination related to this banner advertisement is made by clicking the displayed banner advertisement based on the received link destination click information. The camera retrieval server 10 associates a camera identifier, a link destination display request rate, and keywords received from the network cameras 100a and 100b and store them in a link destination display request rate memory table.

Next, the advertiser's terminal 200 accepts the input of the keyword of the article to which the advertisement is provided, and transmits the entered keyword to the camera retrieval server 10 (Step S03).

The camera retrieval server 10 receives a keyword of the article transmitted from the advertiser's terminal 200. The camera retrieval server 10 retrieves the received keyword of the article, the keyword stored in the stored link destination display request rate memory table, and the network camera 100 with a high link destination display request rate associated with the received keyword of the article. The camera retrieval server 10 transmits the camera identifier of the network camera 100a to the advertiser's terminal 200 when the retrieved network camera 100a is judged to be most appropriate for publishing the banner advertisement (Step S04).

The advertiser's terminal 200 displays the camera identifier received from the network camera 100a. The advertiser's terminal 200 displays the received camera identifier, and at the same time accepts the input of whether to publish an advertisement or not. When an input to allow to publish an advertisement is received, the advertiser's terminal 200 transmits an information for allowing to publish an advertisement to the camera retrieval server 10 (Step S05). In Step S05, the advertiser's terminal 200 transmits such as a camera identifier of the network camera 100a to publish an advertisement, article name, introductory sentence, article image, image of banner advertisement, link destination information set to banner advertisement, and keyword related to banner advertisement as information for allowing to publish an advertisement. On the other hand, when an input to inhibit to publish an advertisement is received, the advertiser's terminal 200 terminates the process.

The camera retrieval server 10 receives information for allowing to publish an advertisement from the advertiser's terminal 200. The camera retrieval server 10 transmits the banner advertisement to the network camera 100a identified by the specified camera identifier based on the received information for allowing to publish an advertisement (Step S06).

The network camera 100a receives the banner advertisement transmitted from the camera retrieval server 10. The user terminal 300 transmits an acquisition request of imaging to the network camera 100a for displaying the video imaged by the network camera 100a (Step S07). The network camera 100a accepts a video acquisition request from the user terminal 300, and transmits the banner advertisement transmitted from the camera retrieval server 10 and the video imaged by itself to the user terminal 300 (Step S08).

The user terminal 300 displays the video and the banner advertisement transmitted from the network camera 100a. The user terminal 300 displays the banner advertisement at the designated position in the video or inside the frame displaying the video.

System Configuration of Camera Retrieval System 1

Figure 2:
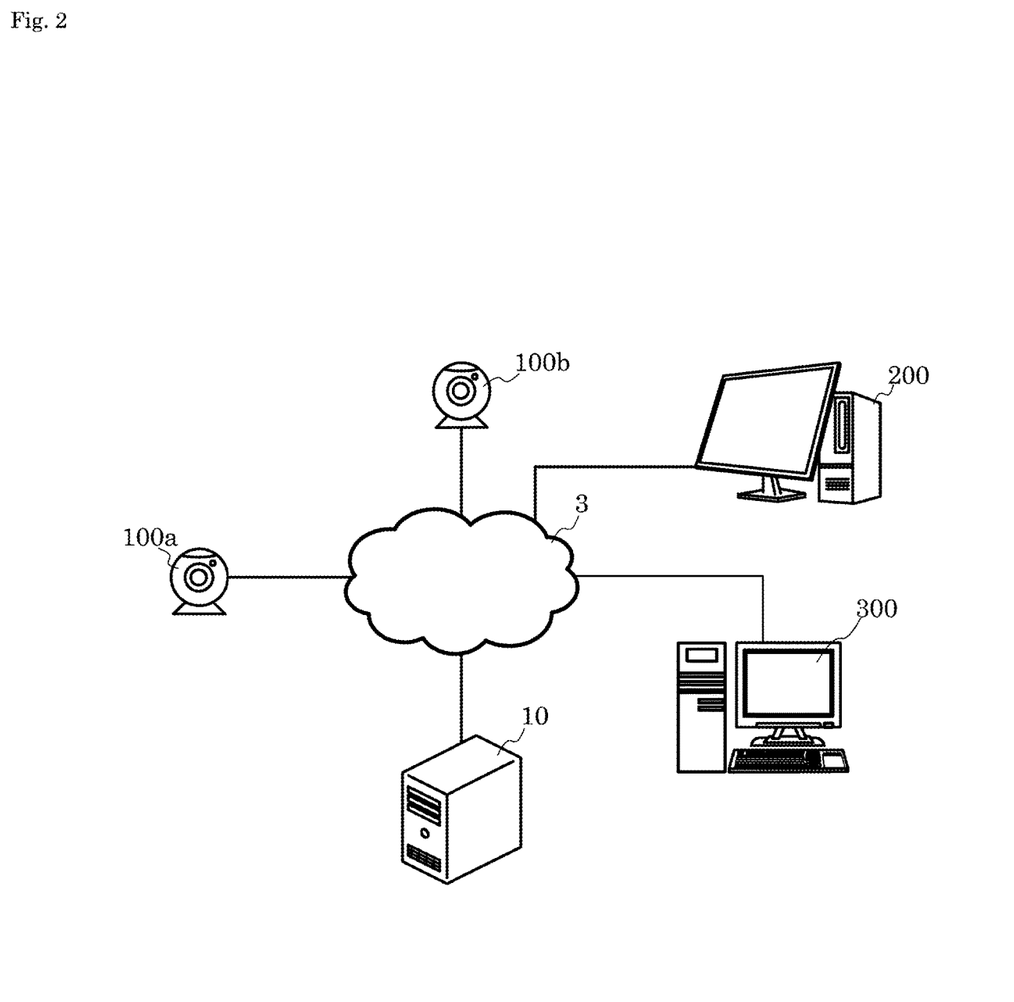
FIG. 2 shows an overall schematic diagram of the camera retrieval system 1.

FIG. 2 shows an overall schematic diagram of the camera retrieval system 1. As shown in FIG. 2, the camera retrieval system 1 includes a camera retrieval server 10, network cameras 100a and 100b (hereinafter simply referred to as "network camera 100" unless otherwise specified), an advertiser's terminal 200, and a user terminal 300. The camera retrieval server 10, the network camera 100, the advertiser's terminal 200, and the user terminal 300 are communicatively connected with each other through public line network 3 (such as Internet network, third generation and fourth generation communication networks).

The camera retrieval server 10 is a server device with the functions to be described later and capable of performing data communication. The camera retrieval server 10 may be, for instance, in addition to a server device, an information appliance such as a personal computer, a mobile phone, a portable terminal, a smart phone, a tablet terminal, a net book terminal, a slate terminal, an electronic book terminal, and a portable music player.

The network camera 100 is a camera device with the functions to be described later and capable of performing data communication. The network camera 100 may be a network camera capable of imaging videos, a camera device such as Web camera or video camera, or a personal computer, a mobile phone, a personal digital assistant (PDA) smart phone, a tablet terminal, a net book terminal, a slate terminal, and an electronic book terminal.

The advertiser's terminal 200 and the user terminal 300 are information appliances with the functions to be described later and capable of performing data communication. The advertiser's terminal 200 and the user terminal 300 are personal computers, mobile phones, personal digital assistants, smart phones, tablet terminals, net book terminals, slate terminals, electronic book terminals, and portable music players.

Functions

Figure 3:
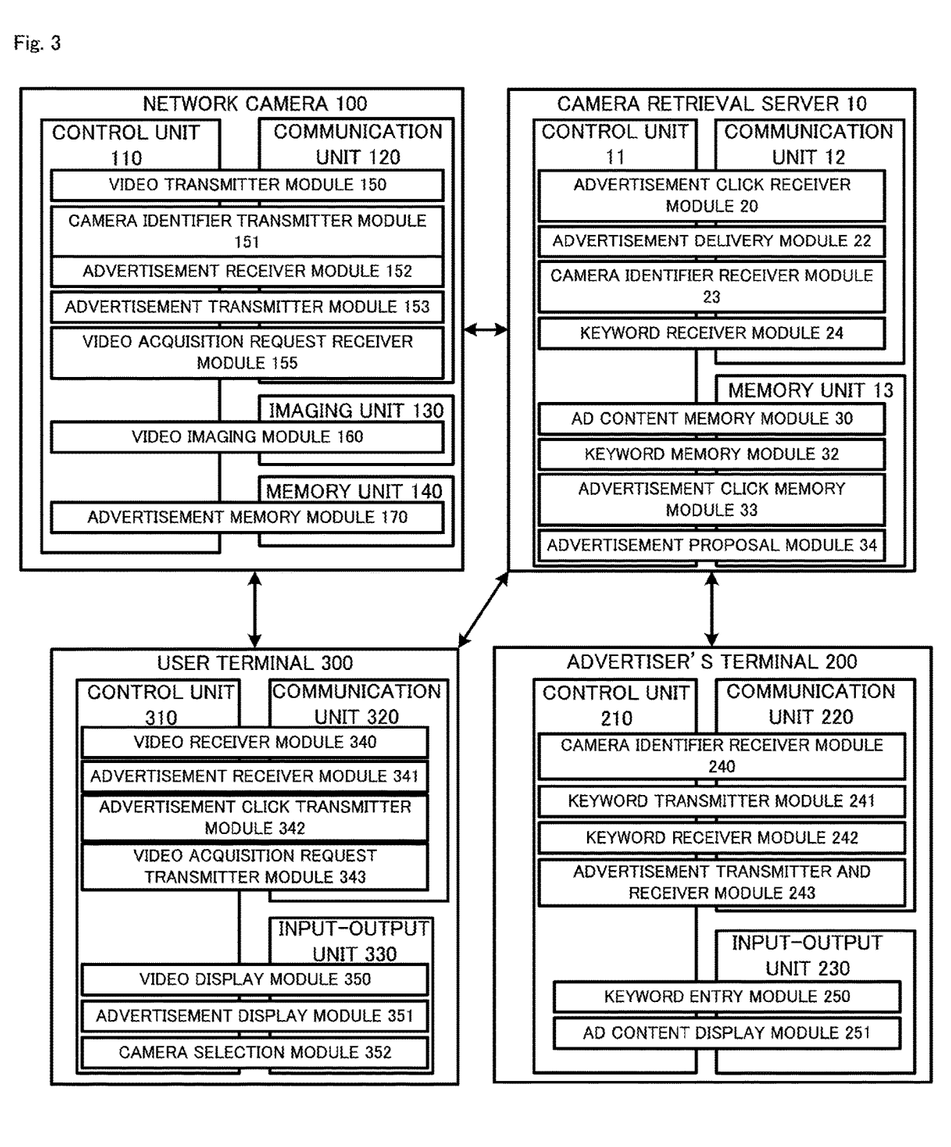
FIG. 3 shows a functional block diagram of the camera retrieval server 10, the network camera 100, the advertiser's terminal 200 and the user terminal 300.

The structure of each device is explained with referring to FIG. 3.

The camera retrieval server 10 is provided with a control unit 11 including a central processing unit (hereinafter referred to as "CPU"), a random access memory (hereinafter referred to as "RAM"), and a read only memory (hereinafter referred to as "ROM"); and a communication unit 12 including a Wireless Fidelity or Wi-Fi® enabled device complying with, for example, IEEE 802.11.

Moreover, the camera retrieval server 10 is also provided with a memory unit 13 such as a hard disk or a semiconductor memory, a recording media, or a memory card to store data, files, or link destination display request rate memory table and vocabulary database which are described later.

In the camera retrieval server 10, the control unit 11 reads a predetermined program and cooperates with the communication unit 12 to achieve an advertisement click receiver module 20, an advertisement delivery module 22, a camera identifier receiver module 23, and a keyword receiver module 24. Moreover, in the camera retrieval server 10, the control unit 11 reads a predetermined program and cooperates with the memory unit 13 to achieve an ad content memory module 30, a keyword memory module 32, a camera identifier memory module 31, and an advertisement proposal module 34.

In the same way as the camera retrieval server 10, the network camera 100 is provided with a control unit 110 including a CPU, a RAM, and a ROM; and a communication unit 120 including Wireless Fidelity or Wi-Fi® enabled device complying with, for example, IEEE 802.11 or a device capable of the wired connection to achieve the data communication with other electrical appliances or the radio access points.

Moreover, the network camera 100 includes imaging devices such as CCD (Charge-Coupled Device) and CMOS (Complementary Metal Oxide Semiconductor) as an imaging unit 130. The network camera 100 is also provided with storage as a memory unit 140 such as a hard disk, a semiconductor memory, a recording medium or a memory card to store data.

In the network camera 100, a control unit 110 reads a predetermined program and cooperates with a communication unit 120 to achieve a video transmitter module 150, a camera identifier transmitter module 151, an advertisement receiver module 152, an advertisement transmitter module 153, and a video acquisition request receiver module 155. The control unit 110 also reads a predetermined program and cooperates with the imaging unit 130 to achieve a video imaging module 160. The control unit 110 also reads a predetermined program and cooperates with the memory unit 140 to achieve an advertisement memory module 170.

In the same way as the camera retrieval server 10, the advertiser's terminal 200 is provided with a control unit 210 including a CPU, a RAM, and a ROM; and a communication unit 220 including Wireless Fidelity or Wi-Fi® enabled device complying with, for example, IEEE 802.11 or a device capable of the wired connection to achieve the data communication with other electrical appliances or the radio access points.

Moreover, the advertiser's terminal 200 is also provided with an input-output unit 230 including a display unit outputting and displaying data and images that have been controlled by the control unit; and also including a touch panel, a keyboard, and a mouse that receive input from a user.

In the advertiser's terminal 200, a control unit 210 reads a predetermined program and cooperates with a communication unit 220 to achieve a camera identifier receiver module 240, a keyword transmitter module 241, a keyword receiver module 242, and an advertisement transmitter and receiver module 243. The control unit 210 also reads a predetermined program and cooperates with the input-output unit 230 to a keyword entry module 250 and an ad content display module 251.

In the same way as the advertiser's terminal 200, the user terminal 300 is provided with a control unit 310 including a CPU, a RAM, and a ROM; and a communication unit 320 including Wireless Fidelity or Wi-Fi® enabled device complying with, for example, IEEE 802.11 or a device capable of the wired connection to achieve the data communication with other electrical appliances or radio access points. Moreover, in the same way as the advertiser's terminal 200, the user terminal 300 is also provided with an input-output unit 330 including a display unit outputting and displaying data and images that have been controlled by the control unit; and also including a touch panel, a keyboard, and a mouse that receive input from a user.

In the user terminal 300, the control unit 310 reads a predetermined program and cooperates with the communication unit 320 to achieve a video receiver module 340, an advertisement receiver module 341, an advertisement click transmitter module 342, and a video acquisition request transmitter module 343. Moreover, the control unit 310 reads a predetermined program and cooperates with the input-output unit 330 to achieve a video display module 350, an advertisement display module 351, and a camera selection module 352.

Camera Retrieval Process

Figure 4:
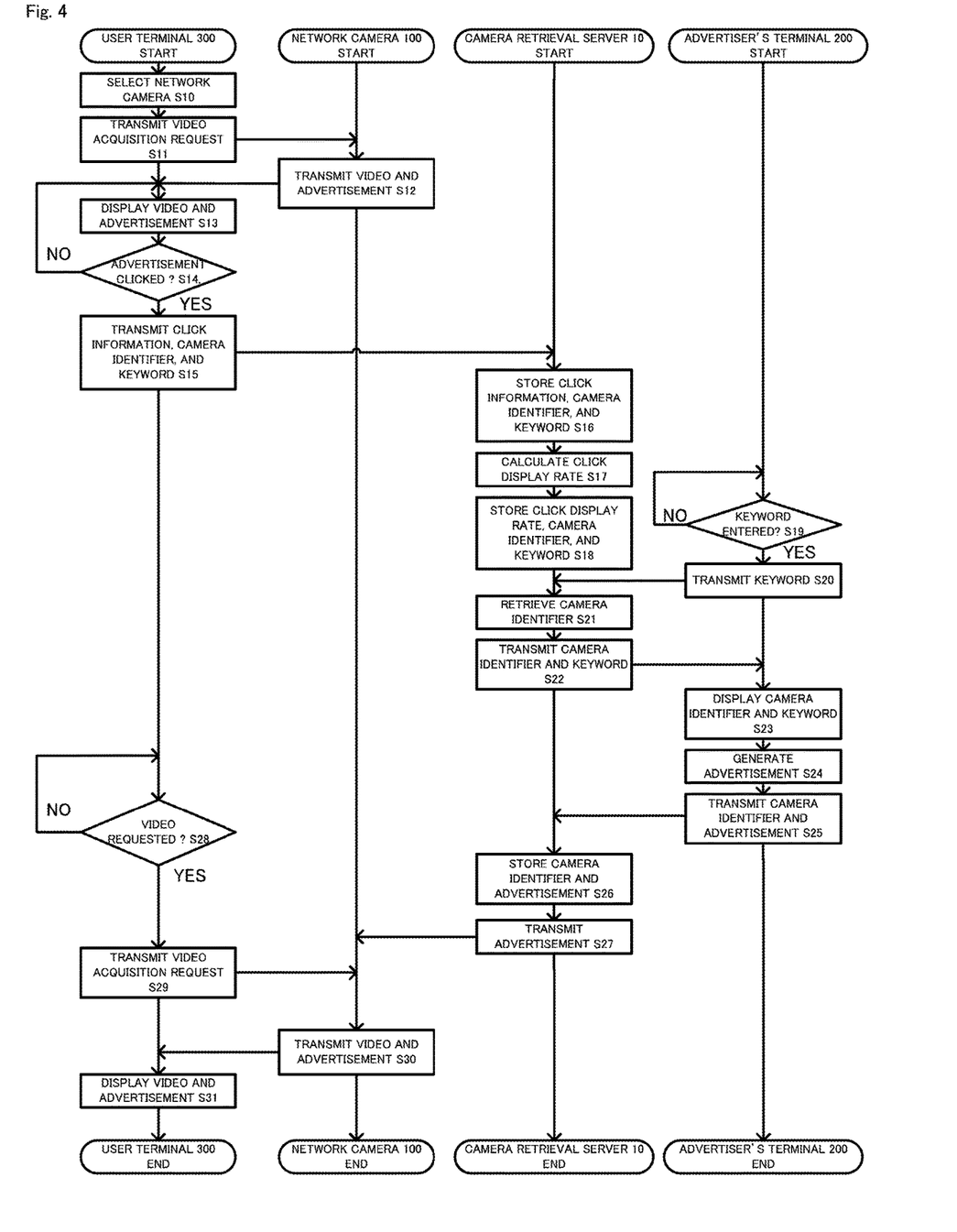
FIG. 4 shows a flow chart illustrating the camera retrieval process executed by the camera retrieval server 10, the network camera 100, the advertiser's terminal 200, and the user terminal 300.

FIG. 4 shows a flow chart of the camera retrieval process executed by the camera retrieval server 10, the network camera 100, the advertiser's terminal 200, and the user terminal 300. The process executed by the modules of the above-mentioned devices is explained together with this process.

First, the camera selection module 352 of the user terminal 300 accepts the input from the user, and selects the network camera 100 to display (Step S10). The video acquisition request transmitter module 343 of the user terminal 300 transmits a video acquisition request to the network camera 100 selected by the camera selection module 352 (Step S11). In Step S11, the video acquisition request transmitted from the video acquisition request transmitter module 343 is a request to acquire the video imaged by the network camera.

The video acquisition request receiver module 155 of the network camera 100 receives video acquisition request transmitted from the user terminal 300. The video transmitter module 150 of the network camera 100, based on received video acquisition request, transmits the video imaged by the video imaging module 160 to the user terminal 300 transmitting the video acquisition request (Step S12). Moreover, in Step S12, the camera identifier transmitter module 151 of the network camera 100 transmits the camera identifier identifying itself to the user terminal 300. The video imaged by the video imaging module 160 may be a still image or moving image. Moreover, the video imaging module 160 may image two or more still images, and edit these images of as a series of images. Moreover, the video imaging module 160 may image a moving image at predefined time interval (for instance, every 1 or 5 seconds), and edit these moving images as a series of images.

Moreover, the advertisement transmitter module 153 of the network camera 100 transmits an advertisement to the user terminal 300 to which the video is transmitted at the same timing when the video transmitter module 150 transmits the video to the user terminal 300 (Step S12). In Step S12, the advertisement transmitter module 153 transmits the advertisement such as a banner advertisement. The advertisement transmitted by the advertisement transmitter module 153 includes advertising positioning information related to the display position. The advertising positioning information is information necessary to display an advertisement in the designated position in the video displayed by the video display module 350, an advertisement in the designated position inside the window frame to display a video displayed by the video display module 350, and an advertisement in the designated position of the input-output unit 330 of the user terminal 300. The advertisement transmitter module 153 may transmit to user terminal 300 without adding advertising positioning information in the advertisement. In this case, the advertisement display module 351 of the user terminal 300 may decide where to display the advertisement and displays the advertisement at the decided position.

The video receiver module of the user terminal 300 receives the video transmitted from the network camera 100. Moreover, the advertisement receiver module 341 of the user terminal 300 receives the advertisement transmitted from the network camera 100. The video display module 350 of the user terminal 300 displays the video received from the network camera 100 (Step S13). Moreover, the advertisement display module 351 of the user terminal 300 displays the advertisement received from the network camera 100 (Step S13).

Figure 5:
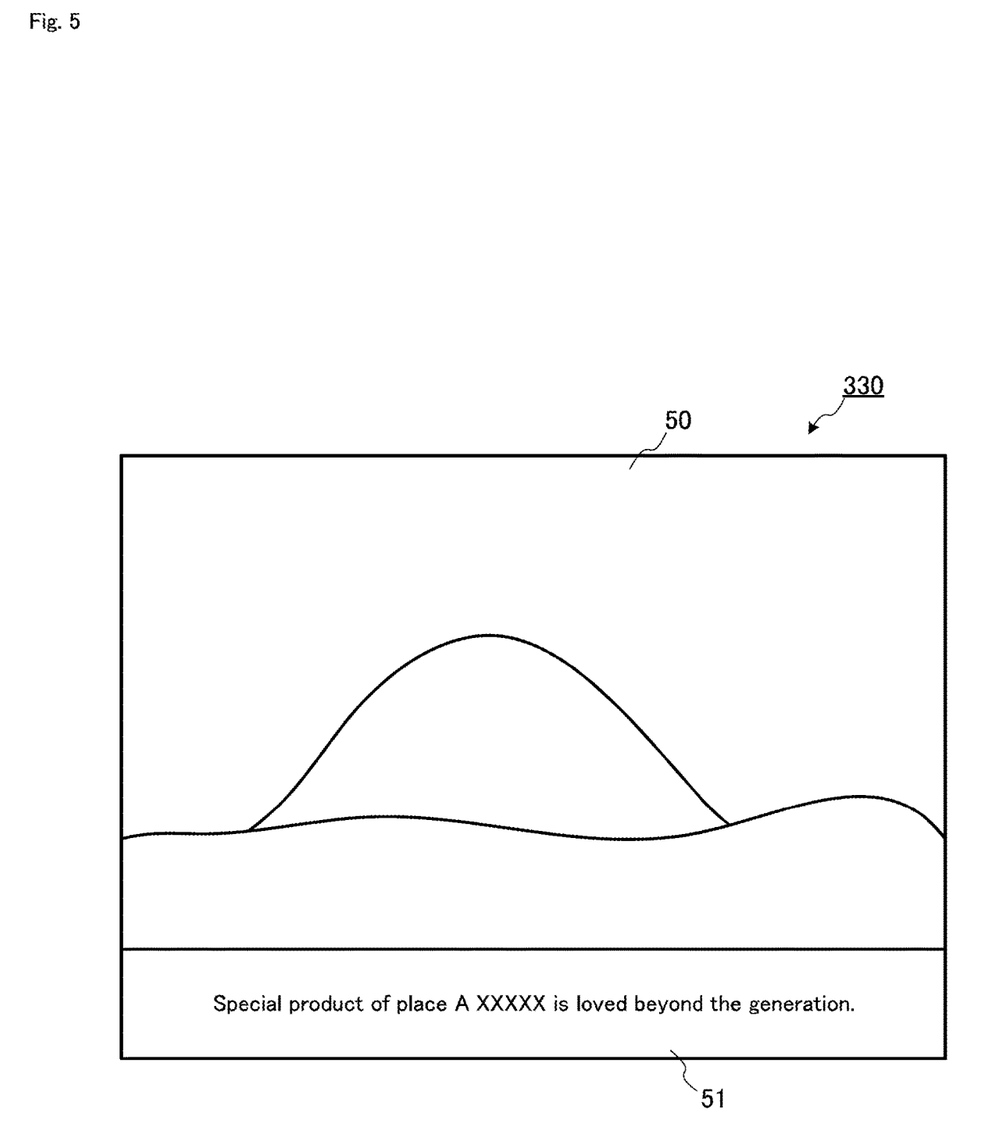
FIG. 5 shows an image of the video and the advertisement displayed by the user terminal 300.
Figure 6:
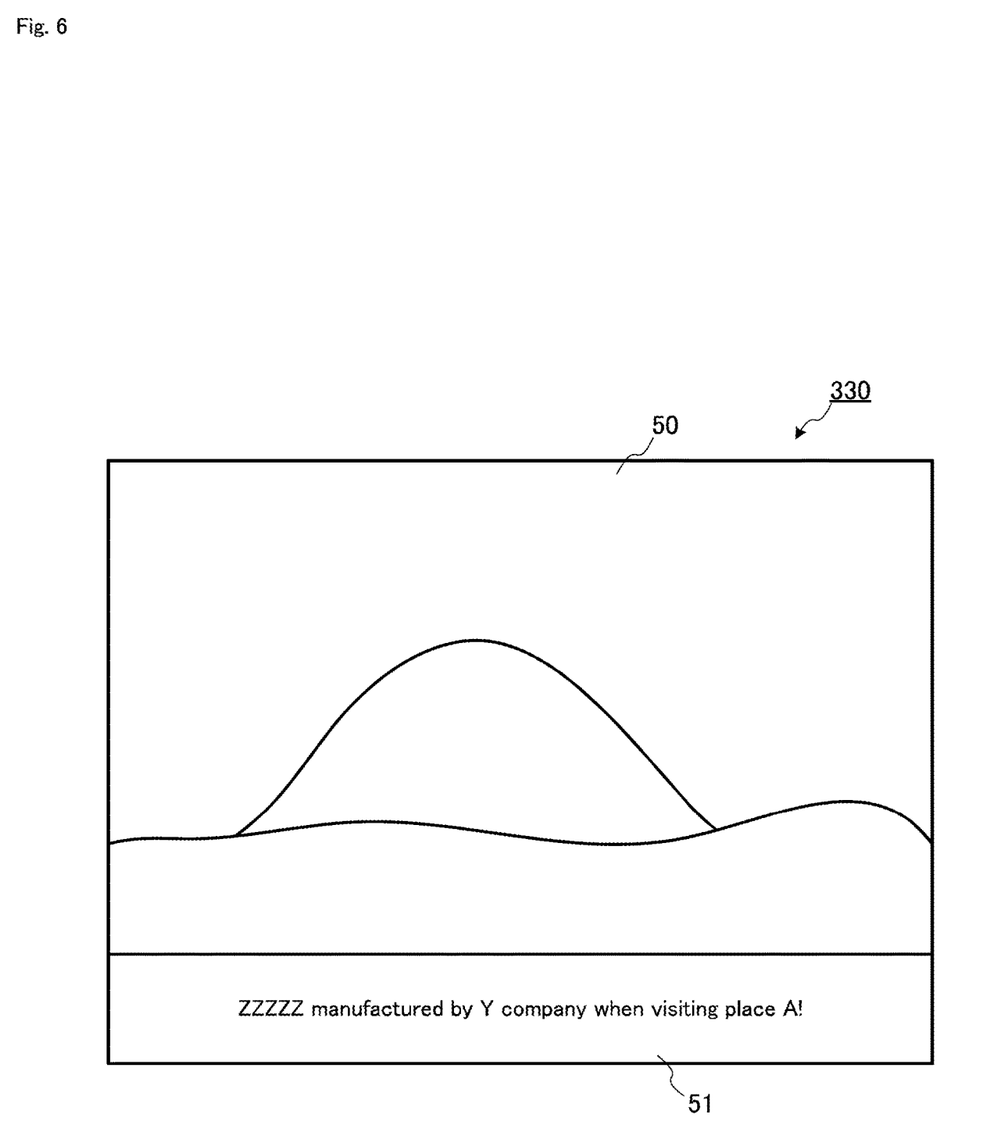
FIG. 6 shows an image of the video and the advertisement displayed by the user terminal 300.

In Step S13, the video display module 350 and the advertisement display module 351 display the video and the advertisement shown in FIGS. 5 and 6. In FIGS. 5 and 6, the video display module 350 displays the video imaged by the video imaging module 160 of the network camera 100 inside the video display frame 50. Moreover, the advertisement display module 351 displays the advertisement received from the network camera 100 inside of an advertisement display frame 51. The video display frame 50 and the advertisement frame 51 are displayed in the input-output unit 330 of the user terminal 300. The advertisement frame 51 displayed by the advertisement display module 351 may be set in the video display frame 50. Moreover, the advertisement frames 51 displayed by the advertisement display module 351 may be set at any other position outside the video display frame 50.

The advertisement click transmitter module 342 of the user terminal 300 judges whether the advertisement displayed by the advertisement display module 351 is clicked or not (Step S14). In Step S14, the advertisement click transmitter module 342 judges whether a user's click operation through the input-output unit 330 of the user terminal 300 is entered or not.

When the display request to link destination of the clicked advertisement is entered, the user terminal 300 displays this link destination using an application, such as Web browser. The advertisement click transmitter module 342 of the user terminal 300 regards the acceptance of the display request of link destination as the advertisement to be clicked (Step S14: YES), and transmits a click information showing the advertisement to be clicked, a camera identifier of the network camera 100 imaging the video currently being displayed, and a keyword related to the advertisement to the camera retrieval server 10 (Step S15). On the other hand, the advertisement click transmitter module 342 regards the non-acceptance of the display request of link destination as the advertisement not to be clicked (Step S14: NO), and repeats the judgement until the advertisement is clicked.

The advertisement click receiver module 20 of the camera retrieval server 10 receives the click information transmitted from the user terminal 300. Moreover, the camera identifier receiver module 23 of the camera retrieval server 10 receives the camera identifier transmitted from the user terminal 300. The keyword receiver module of the camera retrieval server 10 receives keyword transmitted from the advertiser's terminal 200.

The advertisement click memory module 33 of the camera retrieval server 10 stores the received click information (Step S16). The camera identifier memory module 31 of the camera retrieval server 10 stores the received camera identifier (Step S16). The keyword memory module 32 of the camera retrieval server 10 stores the received keyword (Step S16).

The advertisement proposal module 34 of the camera retrieval server 10 calculates the click-through rate of each advertisement based on the stored click information, camera identifier, and keyword (Step S17). In Step S17, the click-through rate of each advertisement calculated by the advertisement proposal module 34 shows the percentage of displayed advertisement to have been clicked by a user to display the link destination of the advertisement for each network camera 100.

Figure 7:
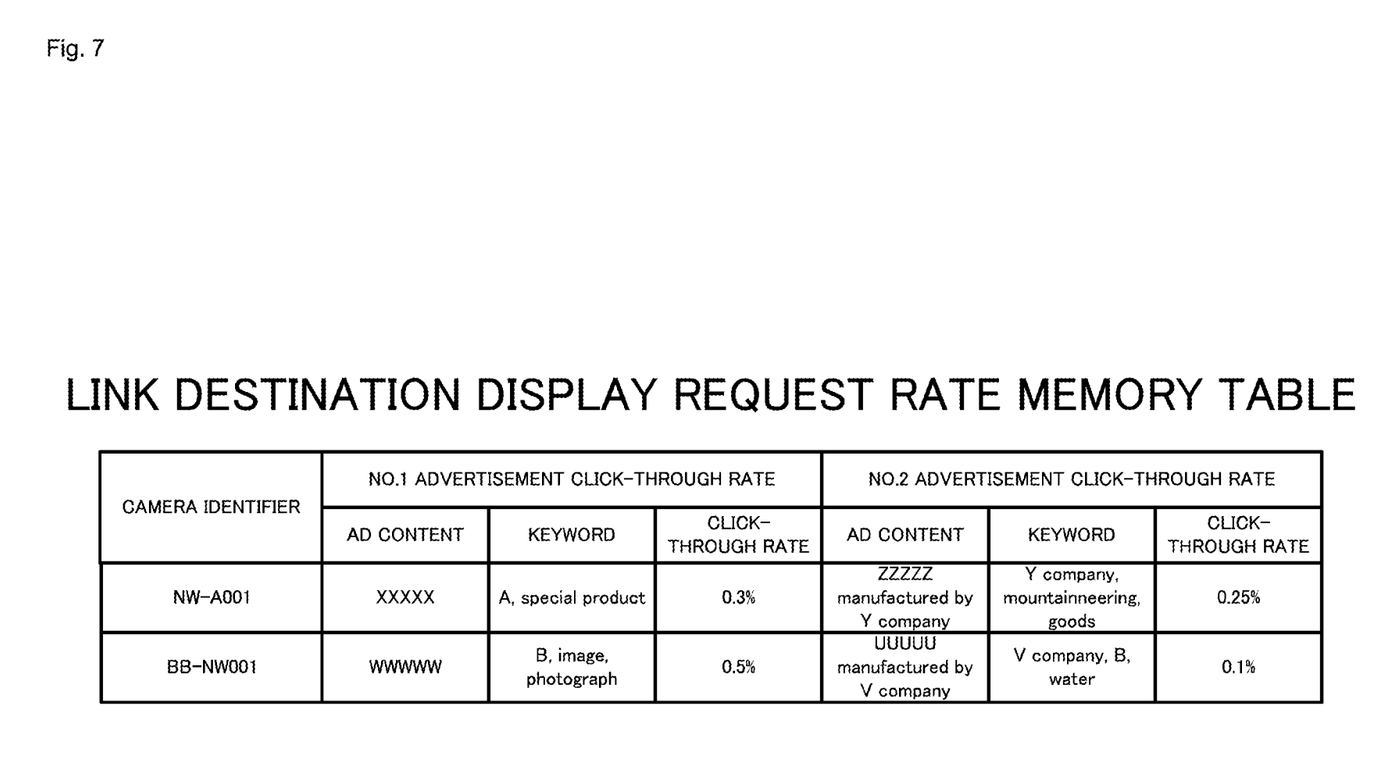
FIG. 7 shows a link destination display request rate memory table stored by the camera retrieval server 10.

The advertisement proposal module 34 of the camera retrieval server 10 associates the calculated click-through rate, the camera identifier, and the keyword and stores them as link destination display request rate memory table shown in FIG. 7 (Step S18).

FIG. 7 shows an image of the link destination display request rate memory table stored by the advertisement proposal module 34. In FIG. 7, a camera identifier of each network camera 100 associates an ad content displayed by the network camera 100 with the camera identifier, a keyword included in the ad content, and a calculated click-through rate. In addition, the ranking is applied to the value of the click-through rate. In FIG. 7, only top two click-through rates are stored, but other lower rates may be stored.

Next, the keyword entry module 250 of the advertiser's terminal 200 judges whether the input of the keyword for the article to publish the advertisement is entered or not (Step S19). In Step S19, when the input of the keyword is judged not to be entered (Step S19: NO), the keyword entry module 250 repeats the process until the input of the keyword is entered. On the other hand, when the keyword entry module 250 judged the input of the keyword to be entered (Step S19: YES), the keyword transmitter module 241 of the advertiser's terminal 200 transmits the entered keyword to the camera retrieval server 10 (Step S20).

Figure 8:
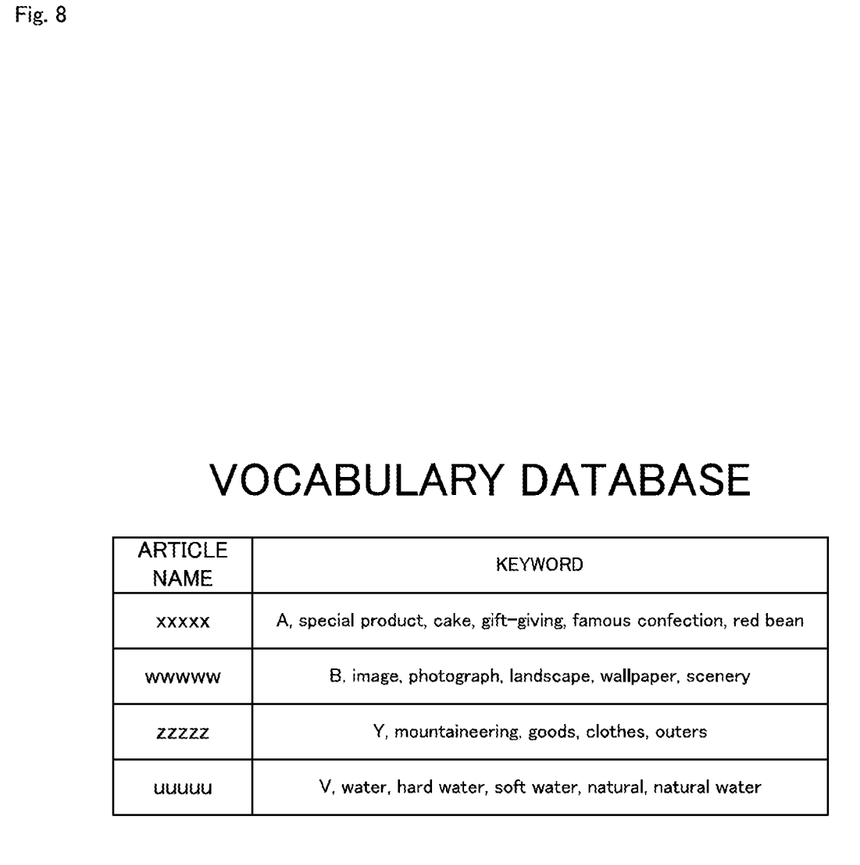
FIG. 8 shows a vocabulary database stored by the camera retrieval server 10.

The keyword receiver module 30 of the camera retrieval server 10 receives a keyword transmitted from the advertiser's terminal 200. The advertisement proposal module 34 of the camera retrieval server 10 refers to the link destination display request rate memory table based on the received keyword, and retrieves a camera identifier with the highest click-through rate among from the received camera identifiers associated with the advertisement including the received keyword (Step S21). In Step S21, when the received keyword is "A", the advertisement proposal module 34 refers to the link destination display request storing table and retrieves a camera identifier "NW-A001" with the highest advertisement click-through rate among from the advertisement click-through rates associated with the keyword "A". The advertisement proposal module 34 extracts retrieved camera identifier "NW-A001", other keyword "special product" associated with the camera identifier, and received keyword "A". Moreover, the advertisement proposal module 34 extracts other keywords related to the received keyword from the vocabulary database in FIG. 8 as other keywords. FIG. 8 shows the vocabulary database stored in the keyword memory module 32 of the camera retrieval server 10. In FIG. 8, the keyword memory module 32 associates and stores two or more keywords per article. For instance, "xxxxx" is associated with article name, and "A", "special product", "cake", "gift-giving", "famous confection", and "red bean" are associated with keyword. The association is same as for other articles. The advertisement proposal module 34 extracts each keyword mentioned above as a keyword including "A" to be other keywords.

The advertisement delivery module 22 of the camera retrieval server 10 transmits the camera identifier, other keywords, and received keyword to the advertiser's terminal 200 (Step S22).

The camera identifier receiver module 240 of the advertiser's terminal 200 receives the camera identifier transmitted from the camera retrieval server 10. Moreover, the keyword receiver module 241 of the advertiser's terminal 200 receives the keyword transmitted from the camera retrieval server 10. The ad content display module 251 of the advertiser's terminal 200 displays the received camera identifier and keyword (Step S23).

The ad content display module 251 of the advertiser's terminal 200 generates the advertisement based on the received camera identifier and keyword (Step S24). In Step S24, the ad content display module 251 generates the advertisement based on the keyword received from the camera retrieval server. The ad content display module 251 generates the best advertisement based on the received keyword. Specifically, the ad content display module 251 combines article name, productive center, and information on such as article included in received keyword, and then generates two or more sentences. Moreover, the ad content display module 251 acquires the image, illustration, and information etc. on the article by which the advertisement stored in the advertiser's terminal 200 is published. The ad content display module 251 generates the advertisement by combining two or more generated sentences with acquired image, illustration, and information etc. on the article. The ad content display module 251 displays the generated advertisement. The keyword in Step S24 includes not only a received keyword but also the keyword corresponding to the broader term of this keyword.

The ad content display module 251 of the advertiser's terminal 200 accepts the input of whether an advertisement to be published or not. When the ad content display module 251 received an input to allow to publish an advertisement, the advertisement transmitter and receiver module 243 of the advertiser's terminal 200 transmits information for allowing to publish an advertisement to the camera retrieval server 10. The advertisement transmitter and receiver module 243 transmits such as a camera identifier to publish an advertisement, article name, introductory sentence, article image, banner advertisement image, link destination information set to banner advertisement, and keyword related to banner advertisement as information for allowing to publish an advertisement. On the other hand, when an input to inhibit to publish an advertisement is received, the ad content display module 251 terminates the process.

The advertisement transmitter and receiver module 243 of the advertiser's terminal 200 transmits the generated advertisement and the camera identifier of the network camera 100 publishing the advertisement to the camera retrieval server 10 (Step S25).

The advertisement delivery module 22 of the camera retrieval server 10 receives the advertisement and the camera identifier transmitted from the advertiser's terminal 200. The ad content memory module 30 of the camera retrieval server 10 stores the received advertisement and the camera identifier (Step S26).

The advertisement delivery module 22 of the camera retrieval server 10 transmits the stored advertisement to the network camera 100 having the stored camera identifier (Step S27). The advertisement receiver module 152 of the network camera 100 receives the advertisement transmitted from the camera retrieval server 10. The advertisement memory module 170 of the network camera 100 stores the received advertisement.

Next, the camera selection module 352 of the user terminal 300 judges whether the acquisition request of the video is made or not (Step S28). In Step S28, when the acquisition request of the video is judged not to be made (Step S28: NO), the camera selection module 352 repeats the process. On the other hand, when the camera selection module 352 judges the acquisition request of the video to be made (Step S28: YES), in the same way as Step S11 mentioned above, the video acquisition request transmitter module 343 of the user terminal 300 transmits the video acquisition request to the network camera 100 to which acquisition request of the video is made (Step S29).

The video acquisition request receiver module 155 of the network camera 100 receives the video acquisition request transmitted from the user terminal 300. In the same way as Step S12 mentioned above, the video transmission module 150 of the network camera 100 transmits the video imaged by the video imaging module 160 of the network camera 100 (Step S30). Moreover, the advertisement transmitter module 153 of the network camera 100 transmits the advertisement stored in the advertisement memory module 170 to the user terminal 100 (Step S30).

The video receiver module 340 of the user terminal 300 receives the video transmitted from the network camera 100. Moreover, the advertisement receiver module 341 of the user terminal 300 receives the advertisement transmitted from the network camera 100. The video display module 350 of the user terminal 300 displays the video in the same way as Step S13 described above (Step S31). Moreover, the advertisement display module 351 of the user terminal 300 displays the advertisement in the same way as Step S13 described above (Step S31).

The process described-above is a procedure of the camera retrieval process executed by the camera retrieval server 10, the network camera 100, the advertiser's terminal 200, and the user terminal 300.

Advertisement Proposal Process

Next, the advertisement proposal process executed by the camera retrieval server 10 is executed. The process is executed at the arbitrary timing of the camera retrieval process mentioned above.

The advertisement proposal module 34 of the camera retrieval server 10 retrieves the advertisement with a high click-through rate and a keyword included in the advertisement based on click information stored in the advertisement click memory module 33 and a camera identifier stored in the camera identifier memory module 31. The advertisement proposal module 34 extracts the article and the keyword of the retrieved advertisement. The advertisement proposal module 34 generates an advertisement of high click efficiency based on extracted article and keyword. The advertisement generated by the advertisement proposal module 34 is an advertisement similar to the advertisement generated in Step S24 mentioned above. The advertisement delivery module 22 of the camera retrieval server 10 transmits the generated advertisement to the advertiser's terminal 200.

The advertisement transmitter and receiver module 243 of the advertiser's terminal 200 receives the advertisement transmitted from the camera retrieval server 10. The ad content display module 251 of the advertiser's terminal 200 displays the received advertisement. The ad content display module 251 accepts the input for the displayed advertisement. The advertisement transmitter and receiver module 243 transmits the entered advertisement to the camera retrieval server 10.

The advertisement delivery module 22 of the camera retrieval server 10 receives the advertisement transmitted from the advertiser's terminal 200. The advertisement delivery module 22 transmits the received advertisement to the network camera 100 having the camera identifier associated with the advertisement.

In the embodiment described above, though the advertisement is transmitted to the network camera, the camera retrieval server may transmit the advertisement directly to the user terminal. In this case, while the video is received from the network camera, the advertisement is received from the camera retrieval server.

To achieve the means and the functions that are described above, a computer (including CPU, an information processor, and various terminals) reads and executes a predetermined program. For example, a program is provided in a form recorded in a computer-readable recording medium such as a flexible disk, a CD (e.g., CD-ROM), and a DVD (e.g., DVD-ROM and DVD-RAM). In this case, a computer reads a program from the recording medium, forwards and stores the program to and in an internal or an external storage, and executes it. For example, the program may be previously recorded in memory (a recording medium) such as a magnetic disk, an optical disk, and a magnetic optical disk, and then provided from the memory to the computer through a communication line.

The embodiments of the present invention are described above. However, the present invention is not limited to these embodiments. In addition, the effects described in these embodiments merely illustrate the most preferable effects resulting from the present invention, and the effects according to the present invention are not limited to those described in these embodiments.

REFERENCE SIGNS LIST

1 Camera retrieval system
10 Camera retrieval server
100 Network camera
200 Advertiser's terminal
300 User terminal

What is claimed is:

1. A system comprising:
a camera retrieval server retrieving a network camera;
a user terminal;
an advertiser's terminal;
wherein the camera retrieval server comprises a communication device, a processor and a memory device that:
receives, from a user terminal, an identifier for identifying each of a plurality of network cameras, a keyword showing a type of a banner advertisement displayed together with a moving image imaged by each of the plurality of network cameras, and click information showing whether the banner advertisement is clicked to display a link destination related to the banner advertisement by a user of the user terminal, the moving image and the banner advertisement being transmitted together with the identifier from each of the plurality of network cameras to the user terminal and being displayed on the user terminal;
calculates a click-through rate showing a percentage of the banner advertisement clicked based on the click information, the keyword, and the identifier, and stores the click-through rate in association with the keyword and the identifier in a table stored in the memory device, so that a plurality of keywords are associated with a plurality of click-through rates and a plurality of identifiers for identifying the plurality of network cameras;

accepts an input of a predefined keyword from an advertiser's terminal;

compares the predefined keyword with keywords stored in the table to extract click-through rates associated with the predefined keyword from among the plurality of click-through rates stored in the table;

referring to the table to extract click-through rates associated with the predefined keyword from among the plurality of click-through rates stored in the table;

referring to the table to extract an identifier, which is associated with a highest click-through rate among the click-through rates, from among the plurality of identifiers stored in the table;

transmits the extracted identifier to the advertiser's terminal via the communication device;

receives, from the advertiser's terminal, a banner advertisement generated by the advertiser's terminal and the extracted identifier via the communication device;

and transmits the banner advertisement received the advertiser's terminal to the network camera having the extracted identifier via the communication device so that the network camera having the extracted identifier transmits a moving image imaged by the network camera and the received banner advertisement to the user terminal.

2. The camera retrieval server according to claim 1, wherein the processor: extracts keywords related to the predefined keyword by referring to a vocabulary database stored in the memory device, each of a plurality of article names being associated with a plurality of related keywords in the vocabulary database;

and transmits the extracted keywords to the advertiser's terminal when transmitting the extracted identifier to the advertiser's terminal so that the advertiser's terminal generates the banner advertisement based on the extracted keywords.

* * * * *